May 11, 1954
H. WILLIG
2,677,974
MECHANICAL CONTROL LINKAGE MECHANISM, ESPECIALLY FOR BRAKE CONTROL
Filed Aug. 1, 1950
2 Sheets-Sheet 1
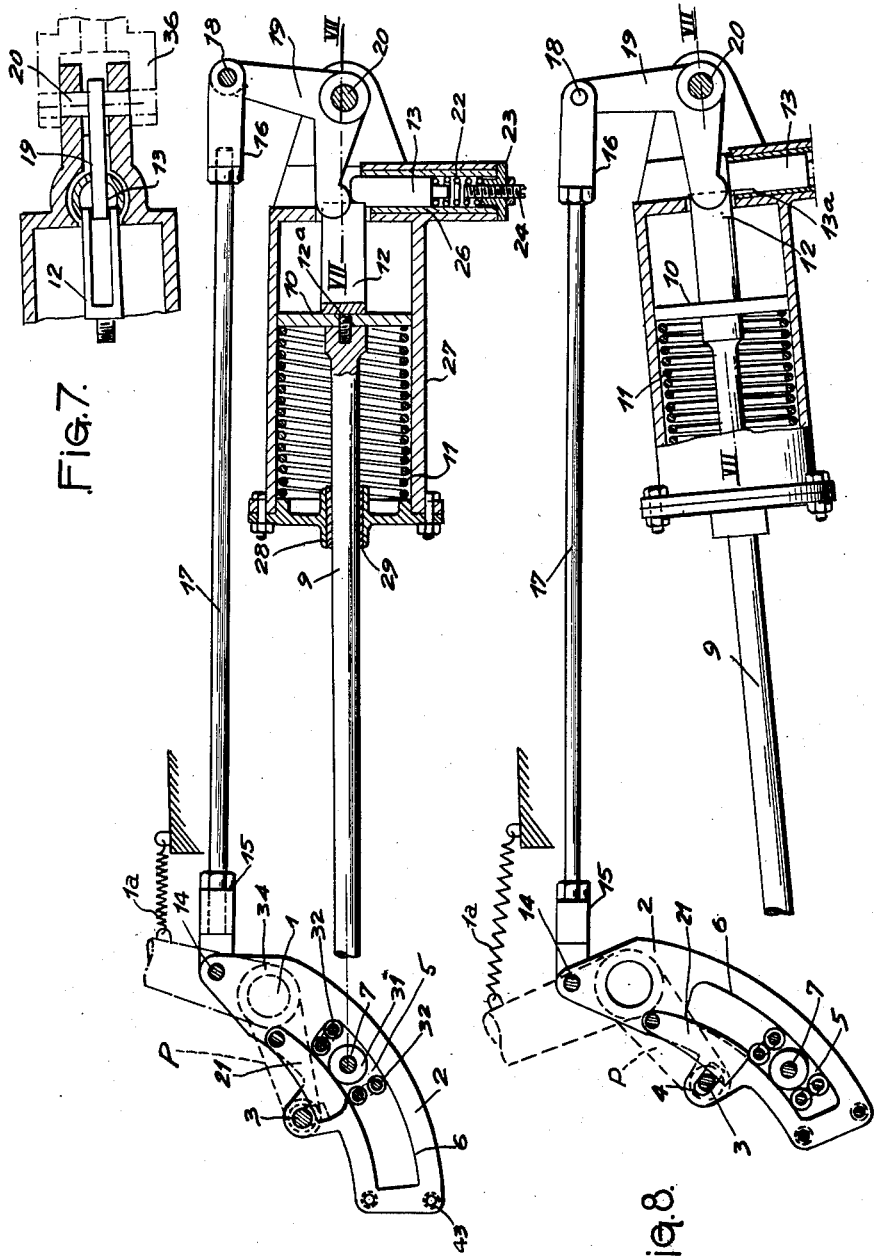
INVENTOR
HIPPOLYTE WILLIG

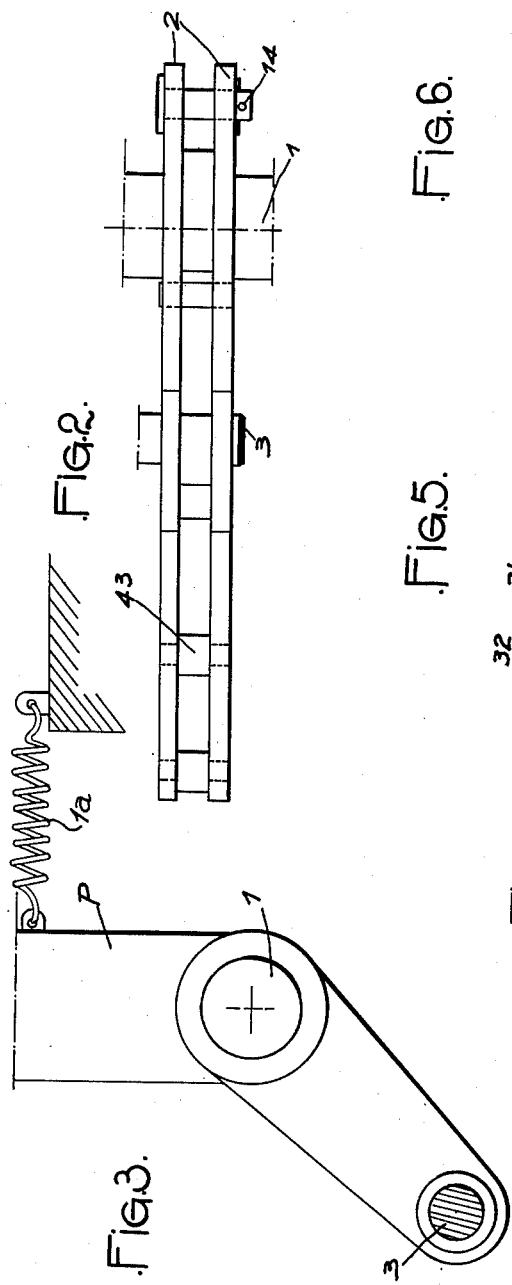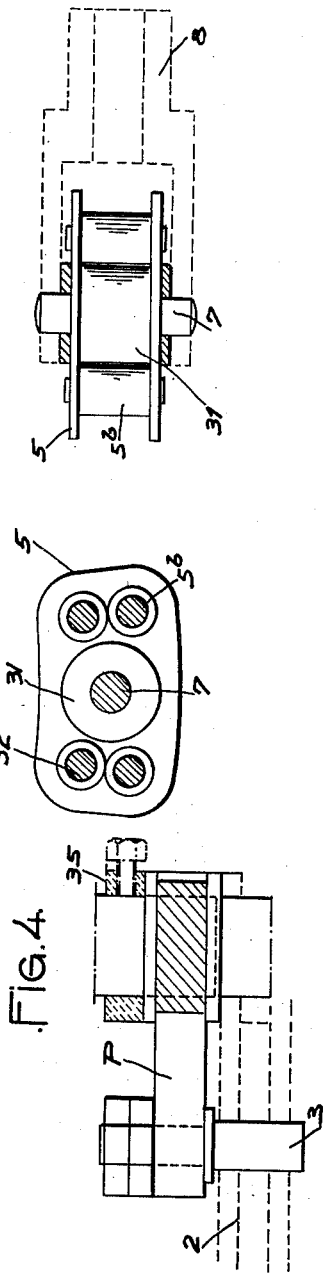

Patented May 11, 1954

2,677,974

UNITED STATES PATENT OFFICE 2,677,974

MECHANICAL CONTROL LINKAGE MECHANISM, ESPECIALLY FOR BRAKE CONTROL

Hippolyte Willig, Paris, France

Application August 1, 1950, Serial No. 177,040

1 Claim. (Cl. 74—516)

This invention relates to mechanical control linkages. In the ensuing disclosure, the invention will be described as applied to the control of vehicle brakes, but it is to be understood that it may be applied to advantage in the control of any mechanical element of a type such that it requires the exertion of considerable stress to operate it towards the end of its stroke.

In the linkages of automotive and other vehicle brakes, the amount of stress required to apply the brake jaws on the related drums depends mainly on the pressure exerted by the driver on the brake pedal.

Such linkages have the virtue of simplicity and of practically total safety. However, they require considerable muscular exertion on the part of the driver. The latter must first overcome the opposing force of the spring or springs that act to restore the linkage connection to its idle or brake-releasing position. While this stress is not very great, as the length of the corresponding stroke of the brake pedal may be large, however, after the brake jaws have engaged the brake drums, the remaining stroke of the pedal is very small and the considerable effort which the driver will have to develop in order to maintain the brakes applied is apt to become tiring if it has to be maintained any length of time.

It is an object of this invention to overcome this drawback while retaining in the linkage connections to which it is applied a purely mechanical type of operation. For this purpose, the invention is essentially characterised in that the relaxing energy of the return spring or springs that tend to restore the control linkage to idle position, is used in part to charge an accumulator of mechanical energy having a small operative stroke, which is adapted to discharge itself thereby applying an additional force to the linkage, after the brake jaws have engaged their respective drums.

In one advantageous embodiment of this essential feature of the invention, the mechanical accumulator or energy-storing means comprises a spring connected to the linkage through a lever, the point of connection of said lever with said spring being movable along the length of the lever, in such a way that the spring will be tensioned with a minimum leverage and will act on the linkage with a maximum leverage, said lever in turn being coupled to the brake pedal through a lost-motion connection, whereby the pedal may be made to control a latch adapted to retain the spring in its compressed condition, and only to release it and thus allow it to act on the brake jaws, after the said jaws have engaged their drums.

The invention further includes other features and advantages which will appear from the ensuing disclosure, relating to one exemplary embodiment of the improvements hereinabove defined in their basic principle, and illustrated in the accompanying drawings wherein:

Fig. 1 is an elevational view, in idle condition, of the mechanism assembly as combined with a brake pedal, parts being broken away and the mechanical accumulator being illustrated in vertical axial section.

Fig. 2 is a plan view of the lever interposed between the pedal and the brake-control linkage.

Fig. 3 is a partial view of the brake pedal in elevation.

Fig. 4 is a corresponding plan view with parts in section.

Fig. 5 is a side view in section on a central plane, of the slide block through which the energy-storing means is connected to the linkage control lever.

Fig. 6 is a corresponding plan view.

Fig. 7 is a section on line VII—VII of Fig. 1.

Fig. 8 is a partial view in elevation, similar to Fig. 1, but showing the mechanism in brake-applying position.

The brake-control linkage to which the invention is applied may be constructed in any of the usual ways widely adopted in automotive vehicles provided with mechanically-controlled brakes. It has not, accordingly, been illustrated in the drawings. According to the invention, the brake pedal acts on a lever which is permanently coupled to the control linkage and to which the "servo-braking" force of the invention is adapted to be applied after the brake jaws have contacted their drums. In the embodiment illustrated, the brake pedal P (Figs. 1, 3 and 4) is mounted for free rotation on a shaft 1 suitably journalled in fixed bearings of the vehicle frame, and the lever 2 is suitably secured to said shaft, as by brazing or welding. The lever 2 is coupled to the control linkage in any appropriate way and the return spring 1a acting to restore said linkage to idle position is also arranged to act on the pedal P to restore it to its idle position. The pedal may for instance be retained against transverse movement on the shaft 1 between a flange formed on said shaft and a stop ring 35 (Fig. 4).

The lever 2, in the embodiment shown, comprises a pair of spaced arcuate flanges retained at their correct spacing by rings and pins 43 (Fig. 2). Formed in the flanges are slots 4 and projecting into the slots is a finger 3 extending transversely from the lower extension of the pedal P; as clearly shown in Fig. 4.

A pair of arcuate apertures formed to a suitable radius are further formed in the flanges of lever 2 to provide a pair of concentric cam- or guide-surfaces 6 for guiding a slideblock member 5 on which the servo-braking effect is to be exerted. This carriage may, for example, be provided in the form shown in Figs. 5 and 6. The member 5 supports a central roller 31 and four further rollers adapted to bear against the cam surfaces 6. The pivots 32 of the rollers are engaged in slots formed in the respective flanges which comprise the slideblock member 5 (see Figs. 5 and 6). The flanges forming the slideblock 5 and thus spaced by the rollers 31 and 32 are retained in assembly by the surrounding arms of a yoke or clevis 8 (Fig. 6) in which the projecting journal ends of the pin 7 of the central roller 31 are pivoted. The clevis 8 is mounted at the end of the rod 9 of the servo-braking device preferably by screw-threaded engagement therewith so that the effective length of said rod may be adjusted by rotation of the clevis relatively to the rod.

The lever 2 is further provided with a latch member 21 for blocking the slideblock 5. The latch 21 is pivoted on a fixed pin projecting from one flange of the lever 2 and is normally urged into contact with the finger 3 by the rollers 31 and 32 of the member 5.

In the embodiment illustrated, the servo-braking effect is provided by a single spring 11 mounted in a cylinder 27 having one of its ends pivoted on fixed pivot 20. The spring 11 acts between a removable end plate 28 of the cylinder 27, and a piston member formed as shown by a disc 10 sliding in said cylinder and secured to the previously mentioned rod 9 that extends through a guide bushing 29 forming a central aperture in the end-plate 28. As shown, the disc 10 having a central hole is centered on the smooth part of a threaded shank 12a extending from a clevis 12 and threaded into an axial threaded hole in the rod 9. The disc 10 is blocked between the end of the rod 9 and the end of the clevis 12 from which the shank 12a extends.

The clevis 12 extends freely through the corresponding end wall of the cylinder 27 and its arms surround the end of the lower arm of a bellcrank lever 19 mounted for free rotation on the pivot 20. The said lower lever arm engages the top of a latching plunger 13 guided perpendicularly to the axis of cylinder 27 in a bushing 26 extending radially from the latter. The latching plunger 13 is urged upwards by a spring 22 acting against a plug 23 secured in the bushing 26. The lower extreme position of the latching plunger 13 is defined by an adjustable stop 24.

The upper arm of the lever 19 is coupled through a link 17 with the upper end of the lever 2. The link may for instance comprise a rod 17 screwed at its opposite ends in clevises 15 and 16 respectively pivoted on a pivot 14 of the lever 2 and a pivot 18 of the lever 19.

The above-described mechanism operates as follows:

Fig. 1 illustrates the various parts in their idle position. The pedal P is raised by the brake-releasing spring 1a and the lever 2 acting through the link 17 maintains the lever 19 in its right-hand end position. Consequently, the latching plunger 13 is at its upper position and the clevis or stop 12 has the free ends of its arms engaged in the notch 13a formed at the upper end of the plunger 13. The servo-braking spring 11 is maintained in its compressed state. The slideblock 5 because of the sloping cam surfaces 6 is in abutment against the upper ends of said surfaces and the finger 3 of the pedal P engages the upper end of the slot 4, while the latch 21 is retracted by the action of the slideblock 5.

To apply the brakes, the operator depresses the pedal P. In its movement the pedal acting through the finger 3 moves the lever 2 rightwards while the slideblock 5 swings together with the rod 9 about the pivot 20, since its spacing from said pivot is held constant by the action of plunger 13. As the brake jaws are about to contact their related drums, the slideblock 5 will have moved down towards the lower ends of the cam surfaces 6 and will occupy a position as shown in Fig. 8 wherein it is retained by the latch 21 urged by the finger 3 of the pedal P during the stroke of the lever 2, from the position of Fig. 1 to that of Fig. 8. The lever 19 coupled through the link 17 with the lever 2 has moved counterclockwise, in the same direction as the cylinder 27 and about the same pivot 20 as said cylinder. It will be understood that, by suitable correlation of the respective lengths of the elements of the above described linkage system, it is possible to cause the above mentioned stroke to occur without any substantial movement of the plunger 13 and consequently without unlatching the clevis 12. However, on the movement being continued, the slideblock 5 will remain substantially stationary in space together with the cylinder 27 relatively to the pivot 20. The lever 2, because of the curvature of the cam surfaces 6, continues to move counterclockwise and pulls the lever 19 which depresses the latching plunger 13. The brake jaws will at that time have moved into contact with their drums and, as the plunger has reached a sufficiently depressed position, the clevis 12 is released and the spring 11 acts to pull the lever 2 through the rod 9 and the slideblock 5 retained by the latch 21. The stress applying the brake jaws on their drums is, then, a function of the reaction of the spring 11 which adds its effect to that of the pressure exerted by the driver on the pedal P. This stress of the spring 11 is exerted on the jaws when the slideblock 5 stands at its maximum distance from the pivot shaft 1, i. e. with maximum leverage.

On the pedal being released, the brake releasing spring 1a restores it to its idle position. In its leftward movement, the finger 3 abuts against the upper end wall of the slot 4 and the latch 21 moves aside to release slideblock 5, which as a result of the curvature of the cam surfaces 6 and the tension of spring 11 rides up the cam surface as far as the top end point thereof, that is to a position located at the minimum distance from the pivotal axis 1, thus allowing the linkage restoring spring to restore all the parts to their rest positions as shown in Fig. 1. The servo-brake spring 11 is again cocked and conditioned for renewed braking action as described.

The invention is, of course, not restricted to the specific form of embodiment illustrated and described and many variations in and departures from the structural details shown may be made, without exceeding the scope of invention as defined in the appended claim.

What I claim is:

Linkage mechanism of the type comprising an operating member which is caused to act when in maximum leverage position, responsive to a predetermined increase in the stress transmitted, and which may be combined with any conventional mechanical control device provided with a return spring, said linkage mechanism comprising a pivoted bellcrank lever, a pivoted actuating element, a link coupling the upper arm of said bellcrank lever with the pivoted actuating element, a mechanical energy storing means maintained in its charged state, a latching means engaging the lower arm of said bellcrank lever and the mechanical energy storing means, a link coupling said storage means with said pivoted actuating element and sliding on said element, so that when the actuating element is moved, the said link coupling said element with said storage means swings until it remains substantially stationary, said actuating element, as it continues to move, pulls the link coupling the upper arm of the bellcrank lever with said element, the said latching means is depressed and the storage means is released and acts to pull the actuating element and adds its effect to that of the pressure exerted on the actuating element, the energy released by the return spring when the control device is relaxed charging said storage means.

References Cited in the file of this patent

UNITED STATES PATENTS

| Number | Name | Date |
| --- | --- | --- |
| 1,679,181 | Schauman et al. | July 31, 1928 |
| 1,790,672 | Lyford | Feb. 3, 1931 |
| 1,810,103 | Flagstad | June 16, 1931 |
| 1,885,551 | Sawtelle | Nov. 1, 1932 |
| 2,094,109 | Sawtelle | Sept. 28, 1937 |
| 2,384,257 | Nilsson | Sept. 4, 1945 |

FOREIGN PATENTS

| Number | Country | Date |
| --- | --- | --- |
| 239,807 | Switzerland | Mar. 16, 1946 |